United States Patent [19]

Brodmann

[11] Patent Number: 4,886,296
[45] Date of Patent: Dec. 12, 1989

[54] BELT FORCE LIMITING DEVICE

[75] Inventor: Peter Brodmann, Brunswick, Fed. Rep. of Germany

[73] Assignee: Volkswagen AG, Wolfsburg, Fed. Rep. of Germany

[21] Appl. No.: 235,947

[22] Filed: Aug. 23, 1988

[30] Foreign Application Priority Data

Sep. 25, 1987 [DE] Fed. Rep. of Germany ....... 3732298

[51] Int. Cl.⁴ ........................ B60R 22/28; B60R 22/00
[52] U.S. Cl. ..................................... 280/805; 280/806
[58] Field of Search ............................... 280/805, 806

[56] References Cited

U.S. PATENT DOCUMENTS 3,438,674  4/1969  Radke et al. ................... 280/805
3,547,468  12/1970  Giuffrida .......................... 280/805

FOREIGN PATENT DOCUMENTS 1506641  8/1967  Fed. Rep. of Germany .

*Primary Examiner*—Kenneth R. Rice
*Attorney, Agent, or Firm*—Brumbaugh, Graves, Donohue & Raymond

[57] ABSTRACT

In the device for limiting the belt forces generated in cases of restraint in safety belts of vehicles described in the specification, a band-shaped component is provided with a longitudinal slot and a bolt-shaped widening body is engaged in the longitudinal slot. The widening body is wider than the slot so that, if a predetermined belt force is exceeded, relative displacement between the component and the widening body will occur, causing widening of the component. In order to maintain the belt force level required for widening as constant as possible along the displacement path, a shaping body acts on the component to restore its shape after widening. The shaping body has two cutting-edge-like wings aligned essentially at right angles to the plane of the component, the wings being arranged to act on the opposite longitudinal sides of the component at an acute angle with respect to the direction of the force applied to the device.

6 Claims, 1 Drawing Sheet

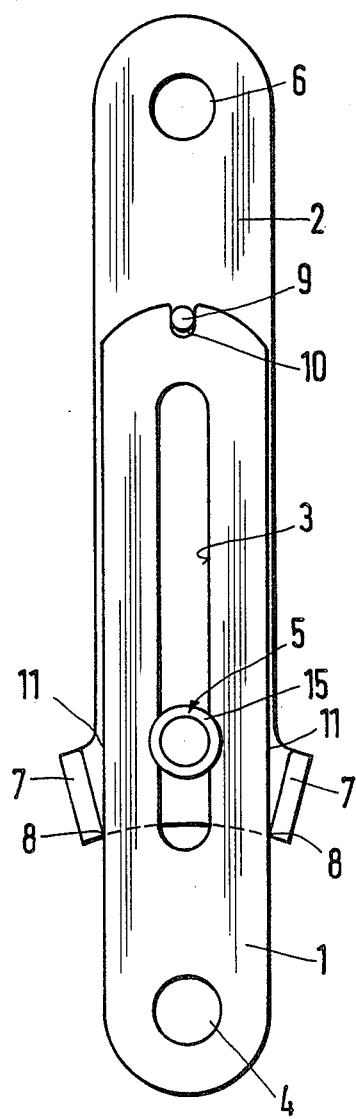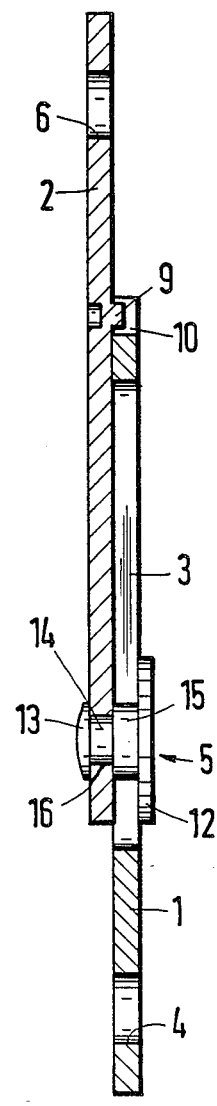

BELT FORCE LIMITING DEVICE

BACKGROUND OF THE INVENTION

This invention relates to devices for limiting the belt forces which are generated in safety belts of vehicles and, more particularly, to such force-limiting devices having a band with a slot and a slot-widening member which forces the sides of the slot apart in response to stress applied to the safety belt.

A belt force-limiting device of this design is known, for example, from German Offenlegungsschrift No. 1,506,641, in particular the device shown in FIGS. 7 and 8 thereof. In this known device, a bolt-shaped slot-widening member fixed on the vehicle body is engaged in a longitudinal slot provided on a safety belt fitting element. In case a stress exceeding a defined belt force is applied as a result of a vehicle accident, displacement of the fitting element relative to the slot-widening body causes energy absorption as the longitudinal slot is widened. However, it has been found that in designs of this kind, the belt force level required for slot widening varies quite considerably over the displacement path, especially if the longitudinal slot is relatively long in order to ensure a predetermined, defined forward displacement path. This results from the fact that in the end regions of the longitudinal slot, relatively large forces are required in order to widen the slot, whereas substantially smaller belt forces are required to widen the middle region of the slot because of the relatively soft side portions of the component containing the slot.

However, for belt force-limiting devices of this kind, it is desirable that the belt force required for deformation of the slot over the entire forward displacement path should be approximately constant or increase only slightly.

SUMMARY OF THE INVENTION

Accordingly, it is an object of the present invention to provide a new and improved belt force-limiting device which overcomes the above-mentioned disadvantages of the prior art.

Another object of the invention is to provide a belt force-limiting device in which the belt force level required for deformation is approximately constant over the deformation path or the forward displacement path of the vehicle occupant.

These and other objects of the invention are attained by providing a belt force-limiting device having a component with a slot and a widening body, along with a shaping member which narrows the slot after it has been widened. Thus, according to the invention, the widening of the component caused by the widening body is reversed to approximately the starting condition by a subsequent restorative shaping. This additional restorative shaping results in an evening-out of the belt force level required for the total deformation along the entire deformation path. Thus, during a vehicular accident, the belt force applied by the safety belt to the vehicle occupant during the forward displacement path of the occupant is limited to a level which remains approximately constant and is below a stress level which might cause injury to the vehicle occupant.

BRIEF DESCRIPTION OF THE DRAWINGS

Further objects and advantages of the invention will be apparent from a reading of the following description in conjunction with the accompanying drawings, in which:

FIG. 1 is a plan view of a representative belt forcelimiting device arranged according to the invention; and FIG. 2 is a view in longitudinal section through the device shown in FIG. 1.

DESCRIPTION OF PREFERRED EMBODIMENTS

In the typical embodiment of the invention shown in the drawings, a belt force-limiting device is made of two parallel, superimposed flat sheet metal strips 1 and 2. The sheet metal strip 1 has a longitudinal slot 3 and a throughbore 4 for affixing one end of the device to a safety belt end or to a mounting point on a vehicle body. The other sheet metal strip 2 is a support body which has a throughbore 6 at its upper, free end for affixing the other end of the device to a vehicle body or an end of the safety belt. It is obvious that, if the support body 2 is joined to a safety belt end, the free end of the component 1 is affixed to the vehicle body and the ends may be suitably arranged for those purposes. For example, if the support body 2 is to be connected directly to one end of the safety belt, it may be provided with a link to receive a belt loop arranged at the end of the belt, which loop is subsequently sewn together. The support body 2 may also be integrated with the rear wall of an automatic winding device holding the wound end of a safety belt, in which case the component 1 may be the holder for the automatic winding device At the end remote from the through-bore 6, the support body 2 has a widening body 5 which is composed, for example, of an attachment rivet with a rivet head 13 and a rivet shaft 14 mounted in a bore 16 of the support body 2, as well as a widening shaft 15 received in the longitudinal slot 3 of the other component 1. On the other side of the component 1, the widening shaft 15 has a retaining head 12 with a relatively large diameter which engages the upper surface of the component 1. The mounting of the attachment rivet is effected in such manner that the component 1 and the support body 2 are held together free from play in the starting position illustrated in the drawings. In the illustrated position, a cylindrical detent 9 at the upper part of the support body 2 engages an outwardly open recess 10 at the end of the component 1 so that the component 1 and the supporting body 2 are held in parallel alignment for the riveting process.

The outer diameter of the widening shaft 15 is made larger than the width of the longitudinal slot 3 so that relative displacement between the component 1 and the support body 2 can occur only when a large tensile force is applied in the longitudinal direction by the safety belt in case of passenger restraint. By an appropriate choice of material for the component 1 and the dimensioning of the width of the longitudinal slot as well as the thickness and width of the component 1 and therefore of the side portions of the component when it is deformed by widening of the longitudinal slot, the tensile force required for relative displacement of the parts 1 and 2, which limits the force of restraint occurring in the safety belt, can be controlled.

In order to achieve the most uniform possible belt force level over substantially the entire displacement path of the two components relative to each other in spite of different deformation conditions, a shaping body is mounted on the support body 2 in addition to the widening body 5. In the illustrated embodiment, the shaping body consists of two wings 7 which extend at right angles from the plane of the component 1 and are formed with opposed edges 8 similar to cutting edges. The edges 8 engage the opposite longitudinal sides 11 of the component 1 at acute angles relative to the direction of any tensile force pulling the two components apart. The shaping body comprising the two wings 7 with the edges 8 confines the longitudinal sides 11 of the component 1 so that, in the event of relative displacement between the component 1 and the support body 2 caused by the belt force during restraint of a passenger, after the component 1 has been widened by the widening body 5 it is reformed by the wings 7 of the shaping body to approximately its original starting condition. Because of this twofold successive deformation of the component 1, a continuous evening-out of the belt force level required for deformation is effected so that the desired constant force gradient over the displacement path can be attained. The distance between the edges 8 of the shaping body 7 and the widening body 5 determines the time between the start of deformation of the parts of the component 1 by the widening body 5 and the restoration of those parts to their original shape by the shaping body 7.

Due to their inclined orientation, the wings 7 form a conical restriction within which the widening of the component 1 is uniformly reversed.

Although the invention has been described herein with reference to specific embodiments, many modifications and variations of the invention will readily occur to those skilled in the art. Accordingly, all such variations and modifications are included within the intended scope of the invention.

I claim:

1. A device for limiting the belt forces generated in cases of restraint in safety belts of vehicles comprising a band-shaped component provided with a longitudinal slot, a support body with a bolt-shaped widening body engaged in the longitudinal slot, the widening body being wider than the width of the slot so that, if a predetermined belt force is exceeded, relative displacement between the band-shaped component and the widening body will occur, causing widening of the component, and a shaping body arranged to act on the outer longitudinal sides of said component to restore its shape following widening.

2. A device according to claim 1 wherein the shaping body is offset relative to the widening body in the direction of the belt force by a selected distance such that the shaping body, following motion along a shaping path corresponding to the selected distance, restores the widened portion of the component to approximately its original condition following widening of the component by the widening body.

3. A device according to claim 1 or 2 wherein both the shaping body and the widening body are held on the support body.

4. A device according to claim 1 or 2 including means for aligning the component and the support body relative to each other.

5. A device according to claim 1 or 2 wherein the component and the support body consist of two flat sheet metal strips superimposed parallel one above the other, one end of one of the strips being connected to one end of a safety belt and one end of the other strip being connected to the vehicle body.

6. A device for limiting the belt forces generated in cases of restraint in safety belts of vehicles comprising a band-shaped component provided with a longitudinal slot, a support body with a bolt-shaped widening body engaged in the longitudinal slot, the widening body being wider than the width of the slot so that, if a predetermined belt force is exceeded, relative displacement between the band-shaped component and the widening body will occur, causing widening of the component, and a shaping body arranged to act on the component to restore its shape following widening, wherein the shaping body is provided with two cutting-edge-like wings extending essentially at right angles relative to the plane of the component, the wings being arranged to act on the two longitudinal sides of the component at an acute angle with respect to the direction of the force applied to the device.

* * * * *